(12) United States Patent
Rahman et al.

(10) Patent No.: US 9,071,744 B1
(45) Date of Patent: Jun. 30, 2015

(54) MOBILE DEVICE FLASH CALIBRATION

(71) Applicant: Amazon Technologies, Inc., Reno, NV (US)

(72) Inventors: Omair Abdul Rahman, San Jose, CA (US); Ted John Cooper, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/305,881

(22) Filed: Jun. 16, 2014

(51) Int. Cl.
*G03B 15/03* (2006.01)
*H04N 5/225* (2006.01)
*H04N 5/378* (2011.01)

(52) U.S. Cl.
CPC ............. *H04N 5/2256* (2013.01); *H04N 5/378* (2013.01)

(58) Field of Classification Search
CPC .............................. H04N 5/2256; H04N 5/378
USPC .......................................................... 396/155
See application file for complete search history.

(56) References Cited

U.S. PATENT DOCUMENTS

| 7,012,633 | B2 * | 3/2006 | Jenkins ........................ 348/180 |
| 2009/0079987 | A1 * | 3/2009 | Ben-Ezra et al. ............. 356/445 |
| 2012/0300044 | A1 * | 11/2012 | Thomas et al. ................. 348/51 |
| 2013/0321802 | A1 * | 12/2013 | Imura ........................... 356/306 |

* cited by examiner

*Primary Examiner* — Rodney Fuller
(74) *Attorney, Agent, or Firm* — Weaver Austin Villeneuve & Sampson LLP (57) ABSTRACT

Techniques for calibrating spatial uniformity of light emitted by a light source include receiving light from a unit under test with an array of photo detectors. Sampling circuitry receives an output signal generated by each of the photo detectors in response to the received light, and samples each of the output signals to generate a sampled output signal for each of the photo detectors. One or more processors determine a spatial uniformity measure of one or both of luminous intensity and chromaticity for the received light using the sampled output signals.

20 Claims, 9 Drawing Sheets

MOBILE DEVICE FLASH CALIBRATION

BACKGROUND

Mobile electronic devices, such as tablets, e-readers and smart phones, include cameras for image capture. Many devices also include a flash LED for illuminating a subject or scene that is to be imaged when the device is in a dark environment. Satisfactory image quality depends on obtaining a light output from the flash LED that is sufficiently bright and sufficiently uniform in brightness and chromaticity across a field of view of the camera. Accordingly, it is necessary to measure and calibrate light emitted from the flash LED to determine its actual output. Such calibration may be performed at the component (flash LED) level or at the device (tablet, e-reader, phone) level of assembly, or both, during design development, and/or as part of quality control testing of production components and devices. Traditionally, measuring the brightness and uniformity of a strobe flash has been accomplished by imaging, with a film camera, a brightness pattern on a standard gray surface wall illuminated by the strobe flash. Post-processing of the film by trained specialists would assess the brightness level (lux level) of light falling on the wall to make a qualitative assessment of the flatness of the illumination across the field of view may be determined. These known techniques are labor intensive and can be difficult to implement where the illumination source is a flash LED rather than a conventional xenon flash tube because of the comparatively low intensity of an LED flash, as well as more severe temporal and spatial non-uniformities typical of an LED flash.

DETAILED DESCRIPTION

Figure 1:
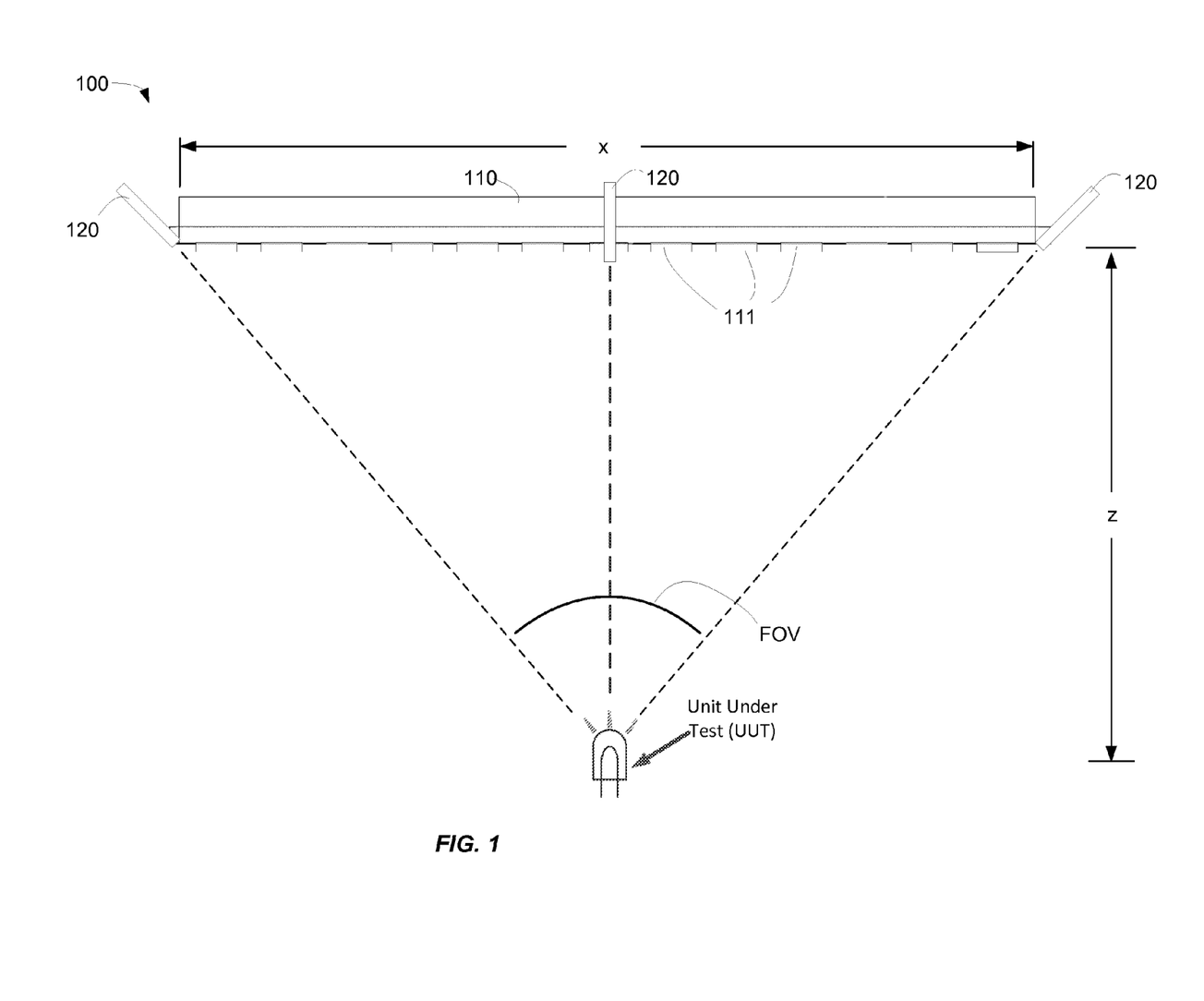
FIG. 1 illustrates an example of a calibration system for a flash LED, according to some implementations.

The presently disclosed techniques relate to quantitatively determining, with a low cost, portable calibration system, the uniformity of brightness and/or chromaticity of a flash LED, particularly for a flash LED that may be implemented in a mobile device such as a smart phone, tablet, camera, or e-reader. FIG. 1 illustrates one example of such a calibration system. The illustrated calibration system 100 includes a number of light sensing elements 111 (e.g., photo transistors) arranged on a photo detector panel 110. The photo detector panel 110 may be configured to include an array or matrix o light sensing elements 111, each light sensing element having associated location information. The unit under test (UUT) includes the flash LED, which may be configured as a standalone component, or as part of a camera with which it is intended to operate, or as part of a larger mobile device such as a smart phone, e-reader or tablet that includes the LED and the camera. The photo detector panel 110 is positioned such that the array is approximately co-extensive with a field of view of the camera with which the flash LED is intended to operate. As described in more detail below, accurate relative positioning of the UUT and the photo detector panel 110 may be facilitated by use of alignment lasers 120.

The calibration system 100 detects the time-varying output of each of the light sensing elements over a flash time duration (which may be referred to as the "illumination period") when the flash LED is pulsed according to a duty cycle. The duty cycle may include a series of low power "pre-flash" pulses (for red-eye reduction, autofocus, etc.) followed, after an interval, by a full power flash (the "main flash"). The duration of the duty cycle may be approximately one or two seconds, whereas the full power flash may have a duration of approximately 150-300 ms (that may be extended up to several seconds if the battery and flash LED of the UUT can tolerate that much energy use). During at least a portion of the duty cycle duration (the portion being referred to as the "data sampling period"), outputs of the photo transistors may be sampled at a rate of approximately 10,000 to 20,000 samples per second. The resulting large data set of samples enables a fine-grained determination of the spatial and temporal variation of brightness and/or chromaticity of the flash LED to be obtained. The data may be integrated over the data sampling period which may, for example, correspond to a foreseen image capture period and/or a pre-flash period to directly obtain the spatial and temporal distribution and/or spectral characteristics of light emitted from the LED. The data sampling period may at least partially overlap the illumination period. The flash time duration, flash power, and preflash sequencing may be varied as desired to simulate various foreseen operating scenarios. The proposed system may use off-the-shelf, low cost components and has been shown to be readily transportable and easy to set up, calibrate and disassemble.

Figure 2:
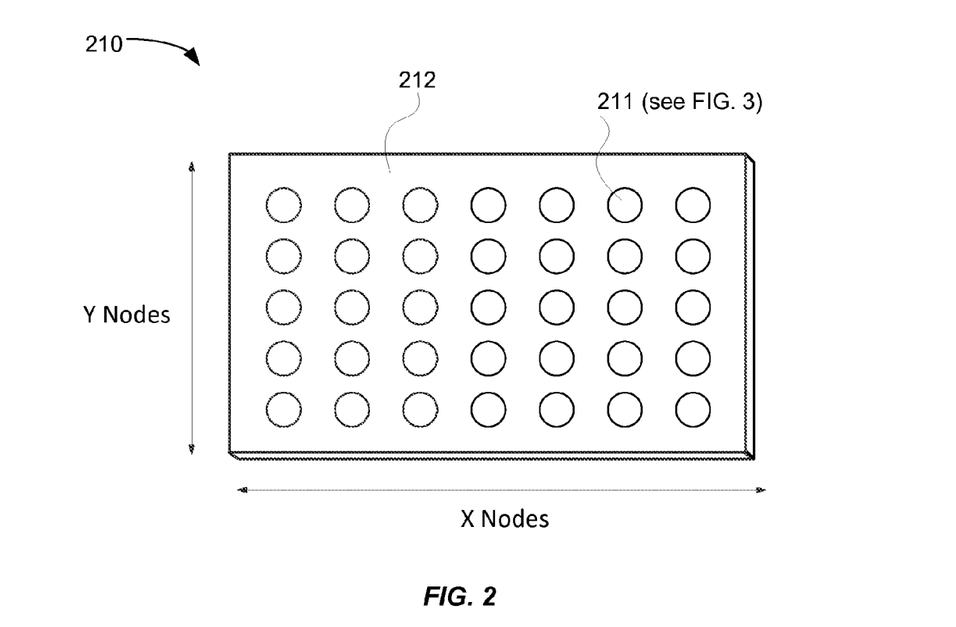
FIG. 2 illustrates an example implementation of a photo detector panel.

Referring now to FIG. 2, an example implementation of a photo detector panel 210 is illustrated. The photo detector panel 210 may include an array of light sensing elements 211. In the illustrated implementation, a 7×5 rectilinear array of light sensing elements 211 is illustrated. However, a greater or lesser number of light sensing elements 211 may be contemplated by the presently disclosed techniques. For example, in some implementations, the photo detector panel 210 may include a 5×4, a 10×8 or a 13×11 array of light sensing elements. In some implementations, the array of light sensing elements 211 may include an array of over 10,000 light sensing elements. It will be appreciated that the light sensing elements 211 may be arranged in a variety of patterns including, but not limited to, rectilinear arrays. For example, the photo detector panel 210 may be circular or elliptical, and the array of light sensing elements 211 may be disposed in an arrangement having a similar form factor. Moreover, spacing between respectively adjacent light sensing elements may vary, so as to provide non-uniform sampling density. For example, in parts of the array where it is desired to obtain finer grained information as to the spatial variation of light characteristics, the light sensing elements may be more tightly spaced together. In some implementations, non-uniform sampling density may be chosen such that the sampling density near edges and/or corners of the array of light sensing elements is higher than the sampling density near the center of the array.

Figure 3:
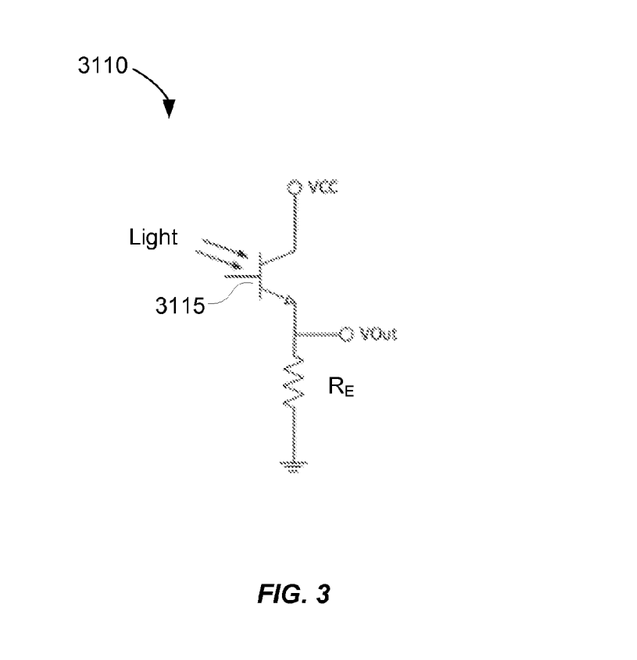
FIG. 3 illustrates a schematic of an example implementation of a photo detector.

Each light sensing element 211 may include a one or more respective photo detectors. In some implementations, referring now to FIG. 3, each photo detector includes a photo transistor 3115 disposed within a common collector photo transistor circuit 3110 that includes precision load resistor $R_E$. When the photo transistor 3115 is exposed to a light input, a current is generated across precision resistor $R_E$ to ground, which results in a voltage, VOut, being created across precision resistor $R_E$. As described below, in connection with FIG. 4, each photo transistor 3115 may be supplied an input voltage VCC, from a power supply of the calibration system, whereas the voltage VOut may be sampled by an Analog-to-Digital convertor (ADC).

In some implementations, physical dimensions of the array of light sensing elements, and/or a location of the array with respect to the UUT, may be selected with regard to a field of view (FOV) of the camera with which the LED is intended to operate. For example, referring again to FIG. 1, where the FOV of the camera is approximately 80 degrees, and distance 'z' is approximately one meter, the width 'x' of the array may be approximately 1.7 meters (2×tan 40°). In such an arrangement, the array of light sensing elements may be said to be approximately coextensive with the camera FOV. In some implementations, the array of light sensing elements may be substantially smaller than the field of view (FOV) of the camera with which the LED is intended to operate when the UUT is disposed at a particular distance from the photo detector panel.

The photo detector panel may include a substrate 212 onto which photo detectors and related equipment may be disposed. The substrate 212 may be formed of any rigid or semi-rigid material. Lightweight, low density materials may be advantageous for portability. In some implementations, for example, the substrate 212 may be a foam art board. In other implementations, the substrate may be a plastic, Plexiglas, carbon composite or aluminum material, for example, that provides more rigidity than a foam art board. A surface of the substrate facing the UUT may be painted or otherwise coated with a gray colored matte surface. For example the surface of the substrate, may approximately replicate a uniform neutral gray reference color, for example that provided by the well-known Kodak Gray Card 18 percent gray surface to provide a standard color balance reference during calibration, for example.

Figure 4:
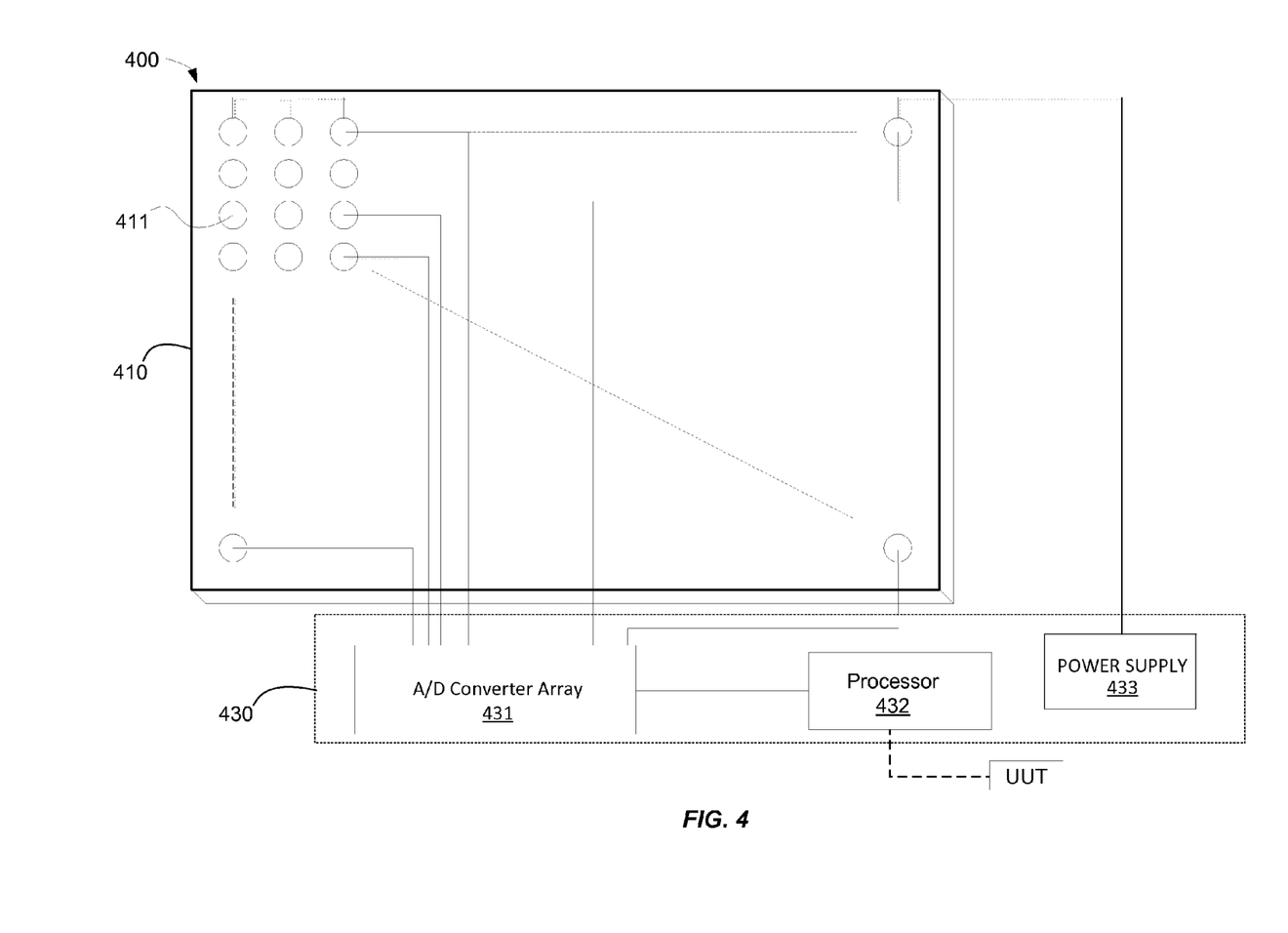
FIG. 4 is a block diagram of an example of the calibration system.

Referring now to FIG. 4, a block diagram of an example of a calibration system 400 is illustrated. The calibration system 400 includes photo detector panel 410, communicatively coupled with a control electronics module 430. In some implementations, the control electronics module 430 may also control the unit under test, but this is not necessarily so. As will be described in more detail, the control electronics module 430 may provide a power input to one or more photo detectors (not illustrated) and alignment lasers (not illustrated) that may be disposed on or be included in the photo detector panel 410. Moreover, the control electronics module 430 may be configured to detect and record outputs from the photo detectors, and determine from those outputs characteristics of light emitted by the UUT. In some implementations, the control electronics module 430 may include an A/D converter 431 that samples, at frequent intervals, analog outputs from the photo detectors and converts those analog outputs to a digital signal for further processing.

In the illustrated implementation, the control electronics module 430 also includes a processor 432, and a power supply 433.

The power supply 433 may be configured to provide a power input to each photo detector included in photo detector panel 410. More particularly, as described above, in connection with FIG. 3, the power supply module 433 may provide input voltage VCC to each photo transistor 3115.

Similarly to the arrangement described in connection with FIG. 2, the photo detector panel 410 includes an array of photo detectors 411. In some implementations, between 20 and 200 photo detectors 411 may be included in the photo detector panel 410. It is contemplated that analog output signals from each photo detector (for example, referring to FIG. 3, analog voltage signal VOut from each photo transistor circuit 3110) may be sampled by the A/D converter 431, at a frequency rate high enough that a substantial number of samples may be taken during the duration of the data sampling period. As a result, the A/D converter 431 may capture many thousands of samples of the voltage signal VOut every second, thereby enabling reduction of noise in the measurement and enabling separation of the "pre-flash" period from the "main flash" period to be clearly distinguished. In some implementations, for example, the A/D converter 431 may sample each photo detector at a rate of at least 1000 samples per second. In some implementations, the A/D converter 431 may sample each photo detector at a rate of at 10,000 to 20,000 samples per second. In some implementations, the A/D converter 431 may sample each photo detector at intervals of time such that at least ten samples are obtained during the duration of the data sampling period. For example, where the LED illumination period is 200 ms, the photo detectors may be sampled at intervals of time not greater than 20 ms. The A/D converter 431 may be configured to perform A/D conversion of analog signals output by each photo detector. As a result, analog voltage signal VOut from each photo transistor circuit 3110 may be sampled, digitized, and output to the processor 432 and/or to a general purpose computer such as a personal computer (PC), laptop or tablet.

The processor 432 may be configured to receive, store and process outputs from the A/D converter 431. In some implementations, the processor 432 may be communicatively coupled with the UUT. For example, the processor 432 may control flash timing and flash duration of a light source of the UUT, or otherwise control the UUT. As a result, the processor 432 may be configured to control, in a synchronized manner, both the operation of the UUT and data collection and data processing operations of the calibration system 400.

In some implementations, the processor 432 may be a dedicated article of laboratory equipment; alternatively, the processor 432 may be a general purpose computer, such as a personal computer, laptop or tablet configured to perform the functions described above. The data received by the processor 432 from the A/D converter 431 may be analyzed to determine temporal and spatial variations of the intensity of light received by the photo detectors. This may be performed automatically, or upon instruction of a user, in real-time, or off-line.

The scope of the analysis and the extent of user involvement may vary depending on the context in which the calibration system 400 is being operated. For example, where the calibration system 400 is being used in a UUT design development process, extensive iterative testing of various modifications of a design prototype of the UUT may be envisioned. A substantial amount of user engagement in data analysis and UUT design optimization might be anticipated in such a use-case scenario, which may include a customized test program using the calibration system 400. On the other hand, in a production environment, it may be contemplated that the calibration system 400 may be operated with relatively less user interaction in such a use-case scenario. The calibration system 400 may be used to perform quality control tests on production UUT's. Such quality control tests may be carried out on every production UUT or on selected units from a production lot, for example. Analysis of test results from such testing may, for example, be autonomously performed by the processor 432 and require little or no user involvement.

Figure 5A:
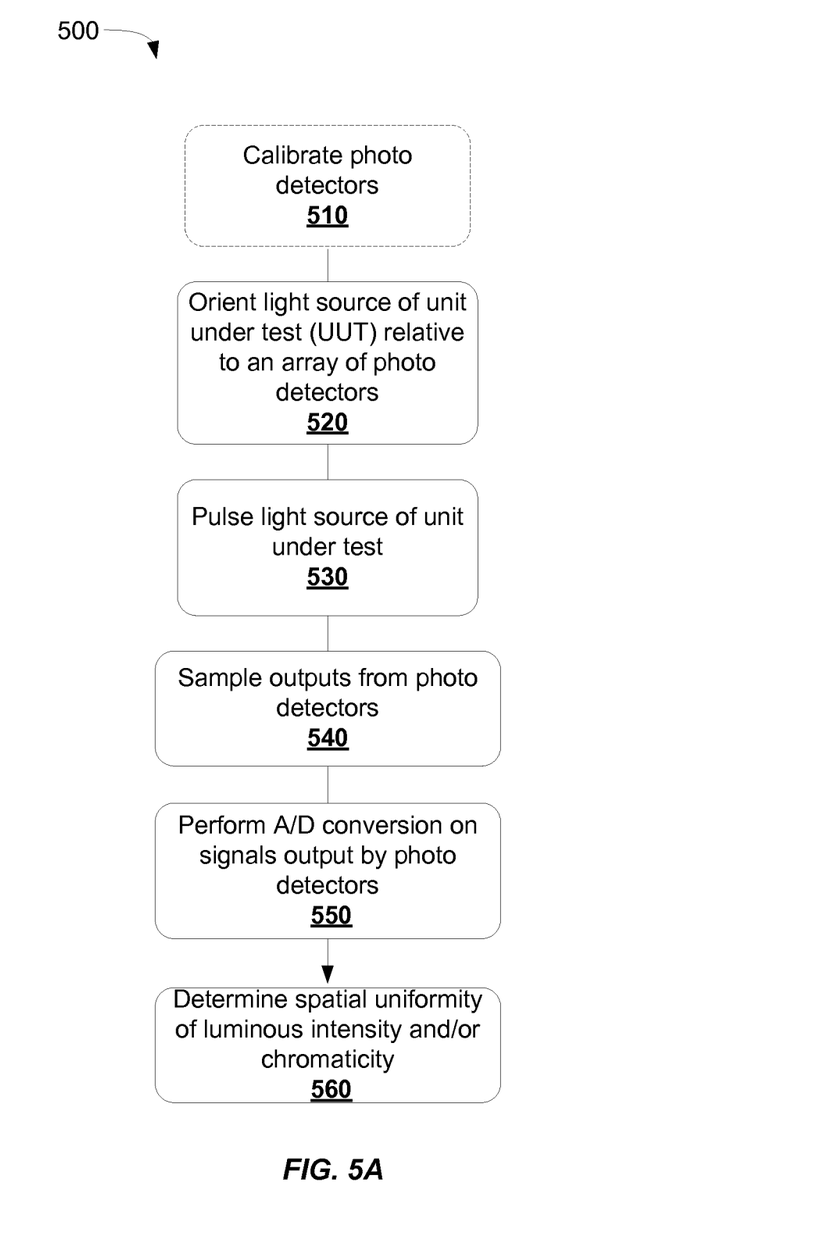
FIGS. 5A and 5B illustrate a method for determining the spatial uniformity of light output by a unit under test.

Referring now to FIG. 5A, a method 500 for determining the spatial uniformity of light output by a UUT will be described. The method 500 may begin, at block 510, by calibrating the photo detectors of a system, as described hereinabove, that includes a photo detector panel communicatively coupled with a control electronics module. It should be noted that execution of process 500 does not necessarily require the calibration process of block 510. It is contemplated, rather, that the calibration process of block 510 may be performed, for example, upon initially setting up the calibration system and from time to time thereafter, for example on a daily, weekly, or monthly basis. Alternatively, or in addition, for monitoring purposes, the process of block 510 may be performed after a specified number of times that the process 500 has been executed, for example, after every $10^{th}$ or every $100^{th}$ execution of process 500. Accordingly, it will be appreciated that in many instances, process 500 will start at block 515.

In some implementations, calibrating the photo detectors in accordance with block 510 includes illuminating the photo detector panel with a calibration light source (CLS), measuring the received light at each photo detector with a photo spectrometer, and determining a calibration coefficient for each photo detector based on a comparison of a characteristic of light received by the photo spectrometer with an average indicated light characteristic determined from outputs of the A/D converter.

Figure 5B:
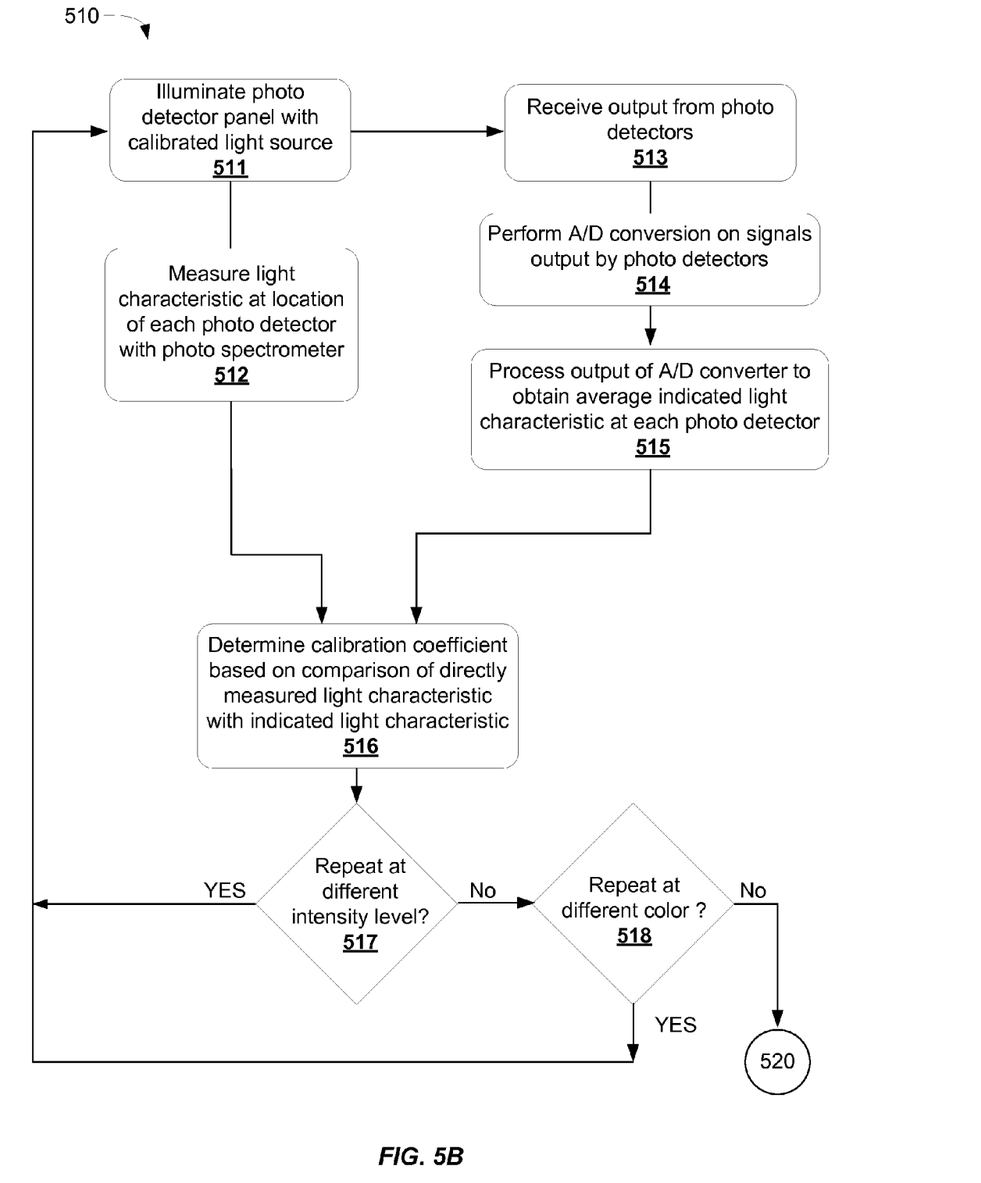

Referring now to FIG. 5B, the calibration process block 510 will be described in more detail. At block 511, the photo detector panel is illuminated by the CLS, which may have a known intensity and/or correlated color temperature (CCT). For purposes of the calibration process 510, the CLS may be located in a similar geometric relationship to the photo detector panel as the UUT is intended to have. For example, referring to FIG. 1, instead of or in addition to the illustrated UUT, the CLS may be located a distance 'z' from the center of the photo detector panel 110. In some implementations, the CLS may emulate, in terms of size, shape, light intensity and CCT, the flash LED light source included in the UUT. In addition, a distance and angular relationship between the photo detector panel and the CLS may emulate the arrangement contemplated for testing of the UUT. In some implementations the CLS may include multiple light sources, each having a respective CCT. One light source, for example, may have a CCT similar to an incandescent light, one may have a CCT similar to fluorescent light, and one may have a CCT similar to a "white" LED.

At block 512, a characteristic of light received proximate to each photo detector is measured. The measurement may be made with a lux meter or a photo spectrometer, for example. The characteristic may represent the intensity and/or chromaticity of the light received. In some implementations, the lux meter may be a standard well-calibrated portable laboratory instrument that may be configured to accurately measure the characteristic of light arriving at a location where the instrument is placed. With such an instrument, a user of the instrument may quickly and accurately obtain characteristics of light arriving at a number of locations, each location being proximate to a respective photo detector location. In some implementations, the instrument may output a resulting characteristic measurement to the user of the instrument. Alternatively or in addition the instrument may output a resulting characteristic measurement to a computer without any user intervention.

At block 513, outputs from each photo detector are received by the A/D converter. It will be appreciated that the outputs from each photo detector will be indicative of a characteristic of light received at that photo detector. The characteristic may represent the luminous intensity of the light received, as measured, for example, in lux. In some implementations, the characteristic may represent a chromaticity of the light received. As described hereinabove, the A/D converter may sample outputs from the photo detectors at a sample rate of 1000 to 20,000 samples per second. A sample rate, on the order of 10,000 samples per second may be desirable taking into account that a duration of the "main flash" may be on the order of 200 ms and the known phenomena of photon statistics results in a need for multiple samples in order to attain an accurate average lux measurement. The digitized outputs of the A/D converter may be processed to obtain an average indication of the light characteristic at each photo detector during a particular interval of time.

At block 516, the calibration coefficient for each photo detector is determined based on a comparison of the directly measured light characteristic, found at block 512, with the average indicated light characteristic, found at block 515. In some implementations, the calibration coefficient is the ratio of measured lux at a respective photo detector divided by a millivolt signal that was measured at the A/D converter for the respective photo detector. More complicated calibration coefficients may be calculated to account for certain geometric variations between photodiodes.

It will be appreciated that, due to various errors, the measured light characteristic, found at block 512, will generally differ from the average indicated light characteristic, found at block 515. Possible sources of error include angular misalignment of the photo detectors, tolerance uncertainties in the performance of, for example, the photo transistor circuit 3110, and errors induced in the A/D conversion process or in the processing of outputs from the A/D converter, or color filtering, if any, of the photo detector.

It is contemplated that the calibration coefficients determined at block 516 for each photo detector may be used to correct for these errors. In some implementations, the calibration coefficients may be used to generate a corrected sampled signal data set for each of the photo detectors. For example, for each photo detector, its output and the outputs of its surrounding nearby photo detectors may be linearized. An interpolation of the neighboring photo detectors linearized output may be performed and a delta coefficient difference obtained between the neighbor photo detectors' linearized values and that of the photodiode under consideration. This delta value can then be distributed as an additive or multiplicative correction to the neighbors in order to obtain a self-consistent approximation that smooths changes of the coefficients. Using these adjusted coefficients, a better approximation to the real light that is measured at each location can be obtained.

At block 517, a decision is made whether or not to repeat the above described process blocks at a different light intensity level. In some implementations, the decision may be based upon a previously determined test plan (e.g. compliance with the test plan may require determining calibration coefficients at two or more specific light intensity levels). In some implementations, for example, it is contemplated that the above described calibration process blocks may be repeated at three or more light intensity levels. Thus, process blocks 511 through 515 may be executed at one, two or many different light intensity levels depending on the accuracy of the calibration requirement. This accuracy requirement may be dictated by the cost and performance of the device to be tested at block 520. Thus, where the device to be tested at block 520 is a relatively low cost, low performance device, a single brightness/illumination test may suffice to give the needed accuracy. However, where a higher performing, higher cost device is to be tested at block 520, calibration at several different light intensity levels may be justified and required. For example, calibration may be carried out at light intensity levels simulating very minimal flash output at one extreme, at very bright flash outputs at the other extreme, and at various intermediated flash outputs.

Alternatively or in addition, the decision may be based upon outcomes obtained as a result of executing process blocks 511 through 515. For example, the outcomes may indicate that a confidence level in the determined calibration coefficients is less than desired and that repeating the above described process blocks may result in a higher confidence level. If the decision at block 517 is to repeat the calibration process blocks, the process will return to block 511.

If the decision at block 517 is not to repeat the calibration process blocks, a determination may be made at block 518 whether or not to repeat the above described process blocks with a different color light. In some implementations, the decision may be based upon a previously determined test plan (e.g. compliance with the test plan may require determining calibration coefficients with two or more colors of light). Thus, process blocks 511 through 515 may be executed with one, two or more colors of light, depending, for example, on the eventual intended use of the device to be tested at block 520. If it is expected that the device will be used in many different color light situations (that is, with different CCT), then the re-measurement and calibration simulating different CCT conditions may be desirable. In general, the test plan may take into account whether the use and the cost and performance of the device justifies the expense of repeating the calibration with different colors of light.

Alternatively or in addition, the decision may be based upon outcomes obtained as a result of executing process blocks 511 through 515. For example, the outcomes may indicate that a confidence level in the determined calibration coefficients is less than desired and that repeating the above described process blocks may result in a higher confidence level. If the decision at block 518 is to repeat the calibration process blocks, the process will return to block 511. Otherwise, the process 500 resumes at block 520.

Referring again to FIG. 5A, at block 520, a light source of the UUT may be oriented relative to an array of photo detectors. For example, referring back to FIG. 1, at block 520 the UUT may be located at a specific spatial location and angular orientation with respect to the photo detector panel 110. In some implementations, the UUT may be located approximately 1 m measured orthogonally from the center of the photo detector panel 110. To obtain good test accuracy and ensure repeatability of test results from unit to unit, it is desirable that the location of an orientation of the UUT be controlled with reasonable precision (+/−1-2 mm, for example). To facilitate this process, in some implementations, lasers 120 may be mounted to photo detector panel 100. The lasers 120 may be prealigned so as to project beams that intersect at an x/y/z coordinate at which the UUT is desired to be placed, for example. Shop aids, including alignment mirrors, distance rods and/or alignment blocks, for example, may be used to facilitate accurate positioning and orienting of the UUT. In some implementations, one of the lasers 120 is located proximate to the center of the photo detector panel 110 and is configured to project a beam normal to the surface of the photo detector panel 110. As a result, an accurate and repeatable test setup may be provided.

At block 530, a light source of the UUT is pulsed, by which is meant that the light source undergoes at least one power on/off cycle. In a typical use case scenario, for example, the UUT is or includes a flash LED, and the flash LED may be pulsed on and off according to a duty cycle, so as to simulate a typical image capturing process. For example, the flash LED may be caused to undergo a duty cycle that includes a series of low-power pre-flash pulses (that may simulate characteristic red eye reduction and autofocusing pre-flash operations), followed by a full power flash that may have a duration of about 150 to 300 ms, for example. It is contemplated that the total flash time duration, including both the pre-flash pulses and the full power flash may be approximately one to two seconds.

At block 540, analog outputs from photo detectors included in the photo detector panel may be forwarded for sampling by the A/D converter. The analog outputs may represent characteristics of the light output by the UUT as a function of time during at least a portion of the flash time duration. For example, as described above in connection with FIGS. 3 and 4, analog voltage signal VOut from each photo transistor circuit 3110 may be received by the A/D converter 431. In some implementations, the output of each photo detector may be an analog voltage or current signal representative of a characteristic of light received by a respective photo detector included in the photo detector panel.

At block 550, the analog outputs from the photo detectors undergo A/D conversion. As described hereinabove the A/D converter may sample outputs from the plurality of photo detectors at a rate of 1000 to 20,000 samples per second, and forward to the processor digital signals representative of the output of the photo detectors.

At block 560, spatial uniformity of light output by the UUT is determined. For example, outputs from the A/D converter may be analyzed by the processor, which may make a determination of the spatial and temporal variation of luminous intensity and/or chromaticity of the light output. Results of this determination may be used in a variety of ways. For example, where the process 500 is being performed during a design development phase, the determination may influence the design. For example, an unacceptable level of measured non-uniformity may result in a decision to relocate a flash LED to a different position within a device such as a tablet or phone. Alternatively or in addition, optical characteristics of the flash LED may be modified by way of external lenses or filters, for example. Where the process 500 is being performed as part of a quality control test on production hardware, an unacceptable level of measured non-uniformity may result in a decision to reject or modify the UUT and/or other units within a lot from which the UUT may have been taken.

Figure 6A:
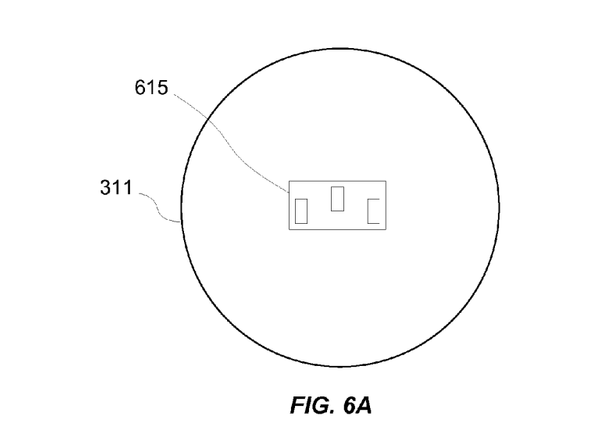
FIGS. 6A-6D illustrate examples of components that may be implemented in the photo detector array.

As described above in connection with FIG. 2, the photo detector panel may include an array of photo detectors. In some implementations, the photo detectors may be photo transistors, although many other types of light-sensitive electronic components are within the contemplation of the present disclosure, including photo diodes, photo resistors, and charge coupled devices, for example. In some implementations, referring now to FIG. 6A, each light sensing location 611 may include only a single photo transistor 615. In other implementations, however, multiple light sensing elements and/or additional components may be co-located at a common light sensing location 611, so as to provide additional functionality to the calibration system.

Figure 6B:
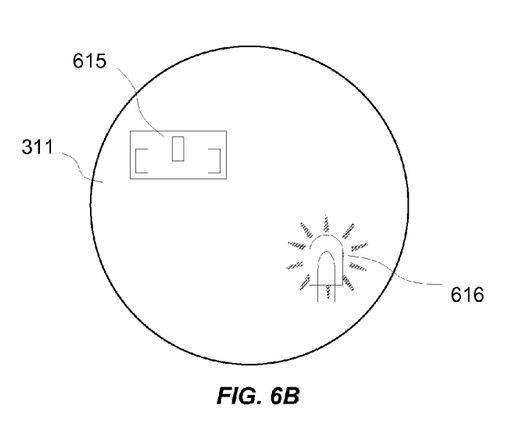

Referring now to FIG. 6B, in some implementations, at least some light sensing locations 611 include both a photo transistor 615 and a light source 616. Light source 616 may be an LED that outputs white light, for example. The implementation illustrated in FIG. 6B may be configured such that a light source 616 located in a respective light sensing location 611 feeds photons into the photo transistor 615 co-located with the LED. The resulting signal from the photo transistor 615 may be used to verify that the photo transistor 615 is still operating correctly. For example, signals from an array of photo transistors 615 may be used as part of a secondary calibration or re-calibration of the photo transistors 615.

In addition, when an illumination array of light sources 616 is illuminated, the illumination array will provide a light field above the center of the array that can be used to calibrate and/or measure the sensitivity of an ambient light sensor (ALS), or camera of a mobile device under test. In some implementations, the illumination array includes 100 or more LEDs that may be simultaneously illuminated, thereby producing a very uniform field of ambient light, the brightness and/or chromaticity of which may be variably controlled. Such a uniform and controllable field of ambient light may be beneficially used to test the performance of an ALS which is required to determine how much light is present near the surface of the device under test. Since flash LEDs are commonly provided on such devices as smart phones, which also have an ALS, it is contemplated that a substantially similar test setup may be used to test both the flash LED and the ALS of such devices The illumination array may provide a flat field illumination source with which to test to test whether the ALS operates properly at different illumination levels. So, in some implementations, the disclosed techniques contemplate testing both the flash LED and operation and accuracy of the ALS with a common test apparatus.

The uniform light field may also be used to determine the linearity and/or spatial orientation of the camera inside the mobile device under test. In some implementations, each LED in an array of white light LEDs may be pulsed in a coordinated manner to measure flicker detection by the camera on the mobile device under test. "Flicker", as the term is used herein, occurs as a result of 50-60 Hz alternating current that cycles incandescent lights on and off. In some implementations, the array of white light LEDs may be pulsed at 50-60 Hz so as to mimic this flicker. With the LED lights pulsing at these rates, response of the UUT may be observed, more particularly, output of the UUT electronics may be tested to see if the UUT recognizes the flicker rate that has been generated.

Alternatively or in addition, some of the light sources 616 may be configured as colored LEDs rather than white LEDs. In such implementations, a resulting color illumination pattern can be used to find chromatic aberrations in the camera under test. For example, calibration and testing of the UUT with light of various CCT may be accomplished with the test apparatus. By having several different LED color lights, the CCT of many different light sources can be simulated by mixing different light colors together, and by pulsing them at different rates to simulate different lighting conditions. The output of the UUT may be examined to determine whether the image colors rendered by the UUT properly corresponds to the simulated lighting condition.

Figure 6C:
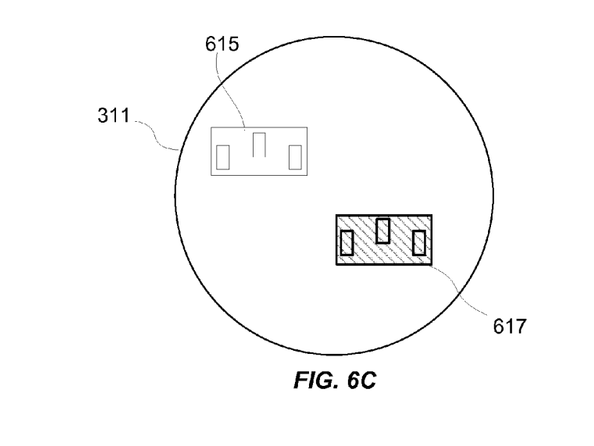

Referring now to FIG. 6C, in some implementations, at least some light sensing locations 611 include both a photo transistor 615 and at least one color-specific photo transistor 617 that has been modified to selectably receive light of a particular color or range of wavelengths. For example, a low-cost colored filter film can be disposed over at least one photo transistor 615 to obtain the color-specific photo transistor 617. The color-specific photo transistor 617 may output an analog signal representative of the luminous intensity of light received at the particular color. The chromaticity of light emitted from a "white light" flash LED under test has significant spatial and time-varying non-uniformity. In implementations where at least some light sensing locations 311 include both the photo transistor 615 and the color specific photo transistor 617, the presently disclosed techniques enable measurement of the spatial non-uniformity of both luminous intensity and chromaticity in the flash LED light as a function of time.

Figure 6D:
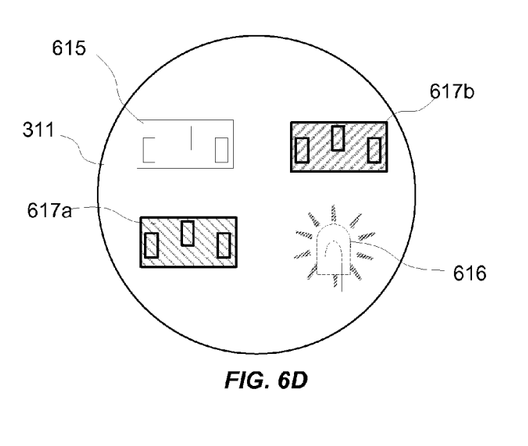

In some implementations, referring now to FIG. 6D, three photo transistors may be disposed within at least some light sensing locations 611, which may or may not also include light source 616. In this implementation, each of color specific photo transistors 617a and 617b may be configured to receive light from an LED and output an analog signal representative only of light having a respective, different range of wavelengths. For example one of photo transistor 617a and 617b may output a signal representative of luminous intensity only of "red" light, while another may output a signal representative of luminous intensity only of "green" light. In such implementations, temporal and spatial variations in the color output of the flash LED may be concurrently measured. Spatial granularity of the measured values may be varied by varying the separation between light sensing locations 611, whereas temporal granularity may be varied by varying the frequency at which the analog output signals are sampled. A difference in the chromatic color of the "pre-flash" versus the "main flash" may likewise be determined using the arrangement illustrated in FIG. 6D. For example, the process blocks 520-560 of FIG. 5A may be executed two or more times, for a given UUT. More particularly, during a first execution of the process blocks 520-560, block 530 may include pulsing the light source in a manner simulating a "pre-flash" sequence. During a second execution of the process blocks 520-560, block 530 may include pulsing the light source in a manner simulating a "main flash". Comparison of the results of the first execution and the second execution may be used to improve the auto white balance algorithm used in a mobile camera, for example.

Figure 7:
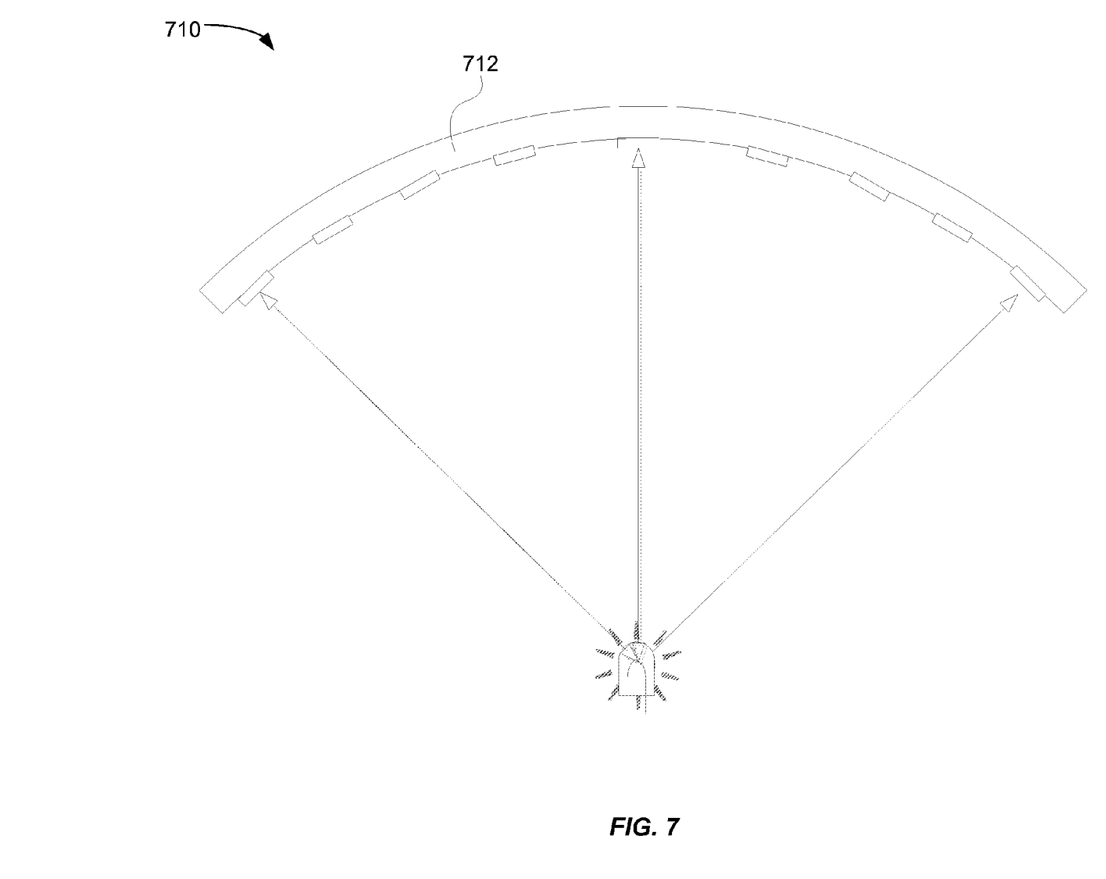
FIG. 7 is an illustration of a photo detector panel having a non-planar substrate.

Referring now to FIG. 7, in some implementations, photo detector panel 710 may include a non-planar substrate 712. The non-planar substrate may be shaped to approximate a cylindrical or hemispherical surface. In such implementations, the photo detector panel may be configured such that each of the photo detectors has a similar radial distance from the CLS and/or the UUT. This simplifies the calibration process, to the extent that variations in radial distance are minimized. Moreover, a very large field of view of the camera flash LED may be completely captured in a more compact arrangement relative to a planar panel.

Figure 8:
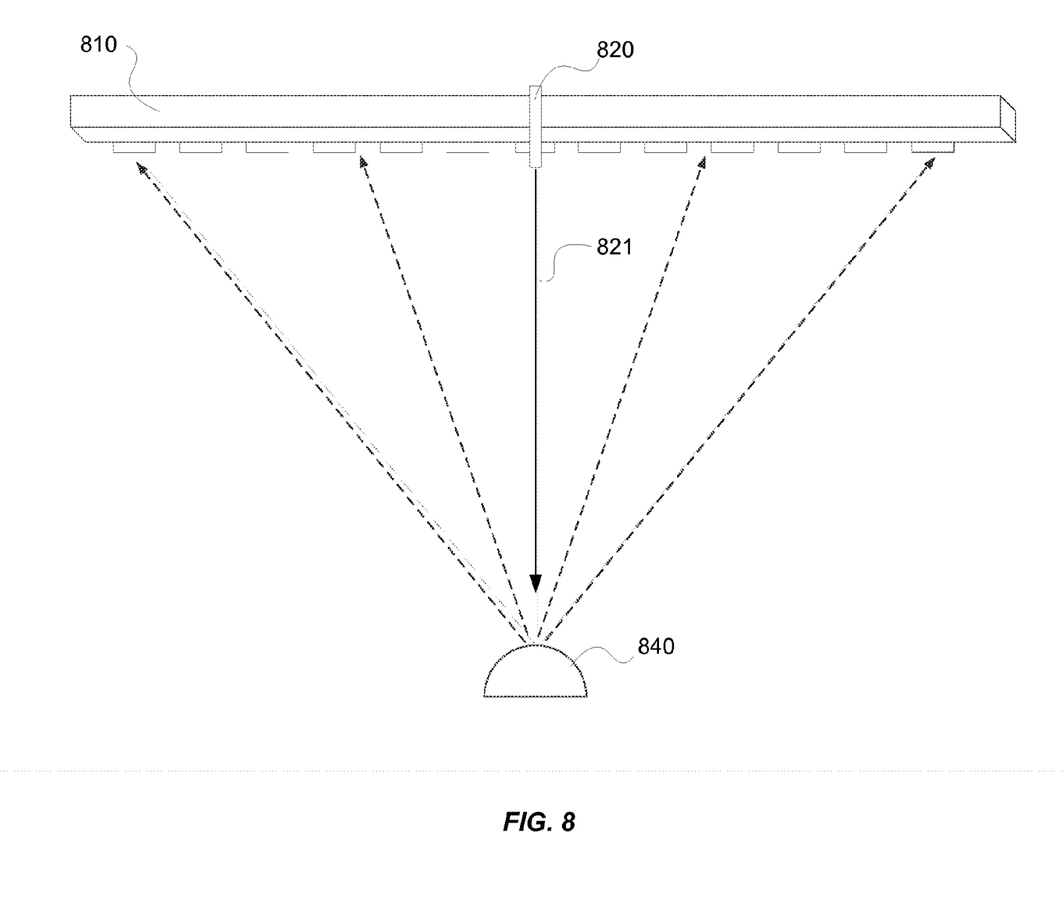
FIG. 8 is an illustration of an implementation including a centrally located laser projecting a beam toward a diffused curved mirror.

As described above in connection with FIG. 5B, in some implementations it is contemplated that calibration of the photo detector array may require use of a CLS having a known geometric location with respect to the photo detector array. Referring now to FIG. 8, an implementation is illustrated that may avoid the necessity of a separate CLS. In the illustrated implementation, a laser 820 located at or near the center of a photo detector panel 810 may be configured to project a beam 821, generally normal to the surface of the photo detector panel 810. In the illustrated implementation, the beam 821 may be directed so as to strike a mirror 840. The mirror 840 may be configured such that the beam 821 is incident upon a curved (e.g., cylindrical or hemispherical) diffusive surface. The mirror 840 may be located at a fixed distance from the center of the photo detector array, and may diffusively reflect back light received from the laser 820 onto the photo detector array. In this arrangement, the laser 820 may serve as the light source that calibrates the array of photo detectors. A calibration process substantially similar to that illustrated in FIG. 5B may be carried out using the above-described arrangement.

Figure 9:
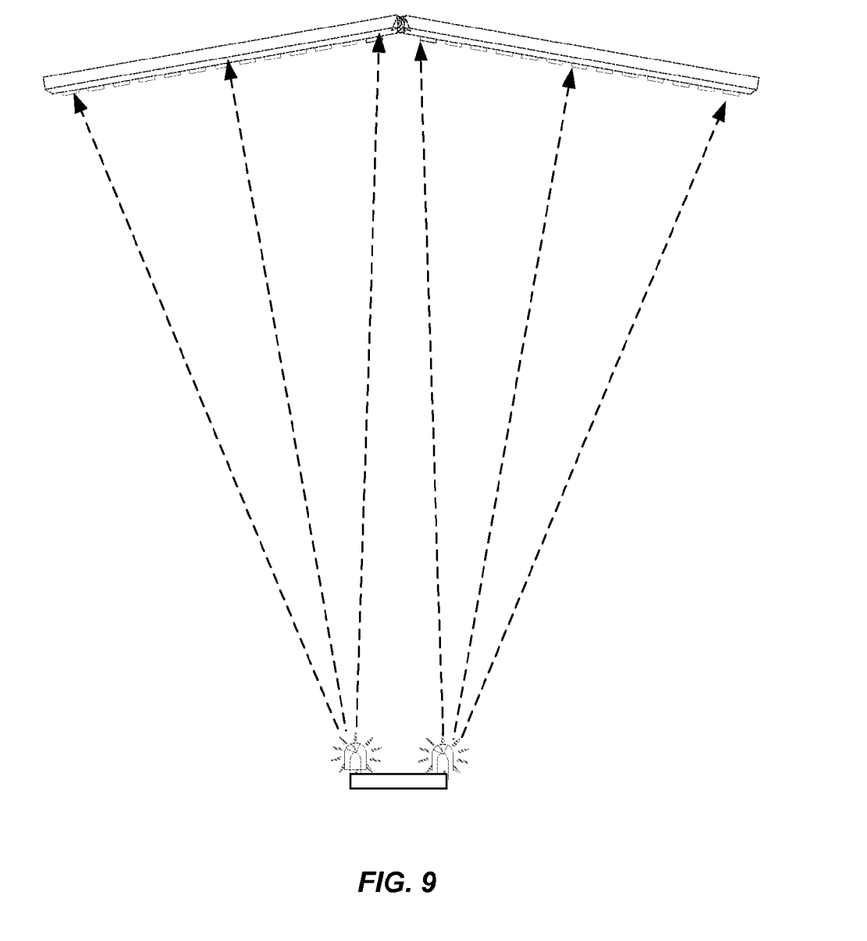
FIG. 9 is an illustration of a photo detector panel having two flat portions and a center hinge.

Still other variants are within the contemplation of the present disclosure. For example, some personal electronic devices may include two or more flash LED's, each disposed at different locations on or within the mobile device. For testing of such devices, referring now to FIG. 9, it is contemplated that the substrate of the photo detector panel may be composed of two flat pieces with a center hinge area that goes through a center of the array of photo detectors. This would allow the system to measure each flash LED independently with approximately normal light projection, as illustrated in FIG. 9. Some implementations may be combined with the techniques described in connection with FIG. 6, wherein multiple photo transistors are configured with colored films. As a result, even more precise measurement of angular non-uniformity of the flash LED light could be obtained.

It will be appreciated that each photo detector disposed in a photo detector array as configured in any of the implementations described hereinabove, will not receive equal amounts of light from the UUT. For example, photo detectors that are farther from the center of the array, particularly those near the corners, will receive less light and produce significantly lower output from a point light source because of the radial fall-off of light going out to the corners. In some implementations, this decreased signal may be mitigated by disposing reflectors around such photo detectors. For, example conical devices with mirrored interior surfaces may be used. Such devices may increase the photon input to the photo detector by close to a factor of ten. It will be appreciated that the calibration method described above, may be adjusted to accurately compensate for the additional gain being provided to such photo detectors.

Another way to increase the signal output of at least some photo detectors is to use a transconductance amplifier. The transconductance amplifiers are available as small, low cost integrated circuits. Output from one of such photo detectors is provided to the transconductance amplifier to boost the amplitude of the output signal before the output signal is provided to the analog-to-digital converter. In some implementations, only photo detectors located near corners of the photo detector may be provided this additional amplification for their signal. However, where it is desired to test a relatively weak flash LED, the entire array of photo detectors could benefit from this enhancement.

Thus, optical calibration techniques for mobile devices have been disclosed. The techniques permit quantitative, near real-time, characterization of uniformity and/or chromaticity of light output by a flash LED and may be usefully applied in a design development environment, or in a production environment. The disclosed system may use off-the-shelf, low cost components and has been shown to be readily transportable and easy to set up, calibrate and disassemble. In some such implementations, the same system is adaptable to testing, in addition to the flash LED, a camera and/or ambient light sensor of a device with which the flash LED is associated.

Examples of some of these implementations are illustrated in the accompanying drawings, and specific details are set forth in order to provide a thorough understanding thereof. It should be noted that implementations may be practiced without some of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
exposing each photo detector in an array of photo detectors to light from a calibration light source (CLS) having one or more of a known luminous intensity, a known geometric location with respect to the array of photo detectors, and a known correlated color temperature;
measuring, for each photo detector, at a location proximate to the photo detector, a characteristic of light received at the location, the characteristic including one or both of luminous intensity and chromaticity;
sampling an output signal generated by each of the photo detectors to generate a sampled calibration signal for each of the photo detectors;
determining, for each photo detector, a corresponding calibration coefficient based on a comparison of the measured characteristic with an average indicated light characteristic determined from the corresponding sampled calibration signal, wherein each calibration coefficient is further based on the sampled calibration signal of the corresponding photo detector and the sampled calibration signals of one or more neighboring photo detectors near the corresponding photo detector;
pulsing, through duration of a duty cycle, a light-emitting diode (LED) to expose the array of photo detectors to light output by the LED;
sampling a respective analog output signal generated by each of the photo detectors in response to the light output by the LED, wherein sampling the respective analog output signal includes performing analog to digital conversion on each respective analog output signal to generate a respective sampled signal data set for each of the photo detectors;
generating a corrected sampled signal data set for each of the photo detectors by using the calibration coefficients for each of the photo detectors to correct the sampled signal data set for errors, the errors relating to one or more of angular misalignment of the photo detectors, tolerance uncertainties in the performance of a photo transistor circuit, and errors induced in sampling the respective analog output signal, or in color filtering of the photo detector; and
determining a spatial uniformity measure for the light output by the LED using the corrected sampled signal data set.

2. The method of claim 1, wherein determining the spatial uniformity measure includes determining a spatial uniformity for one or both of luminous intensity and chromaticity of the light output by the LED.

3. The method of claim 1, wherein the array of photo detectors is aligned with the LED using at least one laser beam generated by at least one laser configured to facilitate mutual alignment between the LED and the array of photo detectors.

4. The method of claim 1, wherein determining the spatial uniformity measure includes integrating, over a data sampling period, the respective sampled signal data set, the data sampling period at least partially overlapping the duration of the duty cycle.

5. An apparatus, comprising:
- an array of photo detectors configured to receive light from a light source;
- circuitry configured to receive an output signal generated by each of the photo detectors in response to the received light, and to sample each of the output signals to generate a sampled output signal for each of the photo detectors; and
- one or more processors configured to determine a spatial uniformity measure of one or both of luminous intensity and chromaticity for the received light using the sampled output signals and calibration coefficients associated with each corresponding photo detector, each of the calibration coefficients based on a sampled calibration signal of the corresponding photo detector and sampled calibration signals of its neighboring photo detectors near the corresponding photo detector.

6. The apparatus of claim 5, wherein the array of photo detectors is disposed on a photo detector panel that includes at least one laser configured to facilitate mutual alignment between the light source and the array of photo detectors.

7. The apparatus of claim 5, wherein the light source is a light emitting diode (LED) for a camera, wherein the camera has a field of view, and the array of photo detectors is approximately co-extensive with the field of view of the camera.

8. The apparatus of claim 5, wherein the array of photo detectors is disposed on a flat or curved substrate, and the substrate is formed from a foam art board, plastic, Plexiglas, carbon composite, or aluminum material.

9. The apparatus of claim 5, wherein the corresponding sampled calibration signal is generated by: exposing each photo detector to light from a calibration light source (CLS) having a known light characteristic and sampling an output signal generated by each of the photo detectors in response to the light.

10. The apparatus of claim 9, wherein the CLS is disposed on or proximate to the photo detector panel, the CLS comprising a laser that emits a light toward a curved diffused minor surface, the curved diffused mirror surface being configured to reflect light received from the laser onto the array of photo detectors.

11. The apparatus of claim 10, wherein the output signal is generated by each of the photo detectors in response to the received reflected light.

12. The apparatus of claim 5, wherein the array of photo detectors includes an illumination array that is configured to illuminate the light source, the light source is proximate to one or both of an ambient light sensor and a camera, and the one or more processors are configured to calibrate a response of one or both of the ambient light sensor and the camera to the illumination array.

13. The apparatus of claim 5, wherein each photo detector in the array of photo detectors includes two or more photo transistors, one or more of the two or more photo transistors including a color filter, and the one or more processors are configured to determine one or both of temporal and spatial uniformity of chromaticity of the received light.

14. The apparatus of claim 5, further comprising an analog-to-digital (A/D) converter that is configured to perform A/D conversion of the analog signal by sampling, during a data sampling period, each photo detector, the sampling including obtaining at least ten samples over the duration of the data sampling period, and outputting a resulting digital signal to the one or more processors.

15. A method comprising:
- pulsing a light source to expose an array of photo detectors to light output by the light source;
- sampling a respective output signal generated by each of the photo detectors in response to the light output by the light source to generate a sampled signal for each of the photo detectors; and
- determining a spatial uniformity measure of one or both of luminous intensity and chromaticity for the light output by the light source using the sampled output signals and calibration coefficients associated with each corresponding photo detector, each calibration coefficient based on a sampled calibration signal of the corresponding photo detector and sampled calibration signals of its neighboring photo detectors near the corresponding photo detector.

16. The method of claim 15, wherein:
- pulsing the light source occurs through a duration of a duty cycle; and
- determining the spatial uniformity measure includes determining a spatial uniformity, during a data sampling period, of one or both of luminous intensity and chromaticity of the light output by the light source, the data sampling period at least partially overlapping the duration of the duty cycle.

17. The method of claim 15, wherein the step of pulsing the light source during the duration of the duty cycle is preceded by calibrating each photo detector in the array of photo detectors.

18. The method of claim 17, wherein calibrating each photo detector includes using a calibrated light source having a known light characteristic, and a known geometric location with respect to the photo detector array.

19. The method of claim 15, wherein the spatial uniformity measure is determined as a function of time.

20. The method of claim 15, wherein the array of photo detectors includes an illumination array, the light source is proximate to one or both of an ambient light sensor and a camera, and the method further comprises calibrating one or both of the ambient light sensor and the camera using light output from the illumination array.

* * * * *